(12) United States Patent
Yamanashi et al.

(10) Patent No.: US 10,619,279 B2
(45) Date of Patent: Apr. 14, 2020

(54) DECORATION PATTERN DATA GENERATING APPARATUS, SEWING MACHINE, AND NON-TRANSITORY RECORDING MEDIUM

(71) Applicant: BROTHER KOGYO KABUSHIKI KAISHA, Nagoya-shi, Aichi-ken (JP)

(72) Inventors: Yoko Yamanashi, Nagoya (JP); Ryutaro Maki, Nagoya (JP); Takafumi Naka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 10 days.

(21) Appl. No.: 16/058,151

(22) Filed: Aug. 8, 2018

(65) Prior Publication Data
US 2018/0347089 A1 Dec. 6, 2018

Related U.S. Application Data

(63) Continuation of application No. PCT/JP2017/000992, filed on Jan. 13, 2017.

(30) Foreign Application Priority Data

Feb. 26, 2016 (JP) .................................. 2016-035674

(51) Int. Cl.
*D05C 5/02* (2006.01)
*D05B 19/10* (2006.01)
(Continued)

(52) U.S. Cl.
CPC ............... *D05C 5/02* (2013.01); *D05B 19/08* (2013.01); *D05B 19/10* (2013.01);
(Continued)

(58) Field of Classification Search
CPC . D05C 5/00; D05C 5/02; D05B 19/08; D05B 19/10
(Continued)

(56) References Cited

U.S. PATENT DOCUMENTS

| 5,775,240 A * | 7/1998 | Hara | ....................... D05B 19/08 112/102.5 |
| 6,587,745 B1 * | 7/2003 | Polden | ................... D05B 19/08 112/475.19 |

(Continued)

FOREIGN PATENT DOCUMENTS

| JP | H01-299584 A | 12/1989 |
| JP | H08-158240 A | 6/1996 |

(Continued)

OTHER PUBLICATIONS

Apr. 18, 2017 International Search Report issued in International Patent Application No. PCT/JP2017/000992.
(Continued)

*Primary Examiner* — Nathan E Durham
(74) *Attorney, Agent, or Firm* — Oliff PLC

(57) ABSTRACT

A decoration pattern data generating apparatus includes: a controller, the controller being configured to control the decoration pattern data generating apparatus to select an embroidery pattern to be sewn, specify an outline of the embroidery pattern, based on embroidery pattern data for sewing the selected embroidery pattern; set an area outside the specified outline, as a decoration area; and generate decoration pattern data for sewing a decoration pattern in the set decoration area.

15 Claims, 16 Drawing Sheets

(51) Int. Cl.
*D05B 19/08* (2006.01)
*G05B 19/4097* (2006.01)
*D05C 3/02* (2006.01)
*D05C 9/06* (2006.01)

(52) U.S. Cl.
CPC .......... *G05B 19/4097* (2013.01); *D05C 3/02* (2013.01); *D05C 9/06* (2013.01); *D05D 2205/02* (2013.01); *D05D 2205/18* (2013.01); *G05B 2219/45196* (2013.01)

(58) Field of Classification Search
USPC .................................................. 700/136–138
See application file for complete search history.

(56) References Cited

U.S. PATENT DOCUMENTS

| | | | | |
|---|---|---|---|---|
| 6,968,255 B1 * | 11/2005 | Dimaridis | ............... | D05B 19/08 |
| | | | | 112/475.19 |
| 7,079,917 B2 * | 7/2006 | Taguchi | ................. | D05B 19/08 |
| | | | | 700/138 |
| 7,814,851 B2 * | 10/2010 | Tashiro | ................... | D05B 19/08 |
| | | | | 112/102.5 |
| 8,061,286 B2 * | 11/2011 | Hirata | ...................... | D05C 5/04 |
| | | | | 112/102.5 |
| 2008/0127870 A1 | 6/2008 | Tashiro | | |
| 2016/0010252 A1 * | 1/2016 | Yamanashi | ............ | D05B 19/10 |
| | | | | 700/138 |
| 2016/0031108 A1 * | 2/2016 | Bailie | ................... | B26D 5/005 |
| | | | | 700/134 |
| 2016/0215423 A1 * | 7/2016 | Kongo | ................... | D05B 19/12 |

FOREIGN PATENT DOCUMENTS

JP   H09-000762   1/1997
JP   2008-136623 A   6/2008

OTHER PUBLICATIONS

Aug. 28, 2018 International Preliminary Report on Patentability issued in International Patent Application No. PCT/JP2017/000992.

* cited by examiner

DECORATION PATTERN DATA GENERATING APPARATUS, SEWING MACHINE, AND NON-TRANSITORY RECORDING MEDIUM

CROSS-REFERENCE TO RELATED APPLICATION

This application is a continuation application of International Application No. PCT/JP2017/000992, filed on Jan. 13, 2017, which claims priority from Japanese Patent Application No. 2016-035674, filed on Feb. 26, 2016. The disclosure of the foregoing application is hereby incorporated by reference in its entirety.

FIELD

The present disclosure relates to a decoration pattern data generating apparatus that generates decoration pattern data for sewing a decoration pattern around an embroidery pattern, a sewing machine mounted with the decoration pattern data generating apparatus, and a non-transitory recording medium that records a program for executing each process in the decoration pattern data generating apparatus.

BACKGROUND

Conventionally, a stippling stitch has been known among stitches for quilting that places batting between front fabric and back fabric, and sews them with a decoration pattern made up of lines, curves, etc. For example, conventionally, application of stippling to the inside of a pattern has been known.

SUMMARY

Incidentally, in a case of sewing a stippling decoration pattern outside an embroidery pattern, a decoration pattern sewing area has been conventionally set as follows. That is, first, an operator takes an image of a sewing object onto which an embroidery pattern is applied, and displays the image on a display screen of a sewing machine. Next, the operator manually draws an outline of the embroidery pattern on the displayed, taken image. The outside of the outline thus manually drawn by the operator is set as a decoration pattern sewing area.

As described above, conventionally, the decoration pattern sewing area has been set on the basis of the outline manually drawn by the operator. Accordingly, the operator's skill level, dexterity, etc. vary the accuracy of the drawn outline. It becomes difficult to set accurately a decoration pattern application area.

The present disclosure has been made in view of the situations described above, and has an object to provide a decoration pattern data generating apparatus that can accurately set a decoration pattern application area in a case of applying a decoration pattern around an embroidery pattern, a sewing machine mounted with the decoration pattern data generating apparatus, and a non-transitory recording medium that stores a program for executing each process in the decoration pattern data generating apparatus.

A decoration pattern data generating apparatus according to the present disclosure is a decoration pattern data generating apparatus, comprising: a controller, the controller being configured to control the decoration pattern data generating apparatus to: select an embroidery pattern to be sewn; specify an outline of the embroidery pattern, based on embroidery pattern data for sewing the selected embroidery pattern; set an area outside the specified outline, as a decoration area; and generate decoration pattern data for sewing a decoration pattern in the set decoration area.

This summary is not intended to identify critical or essential features of the disclosure, but instead merely summarizes certain features and variations thereof. Other details and features will be described in the sections that follow.

BRIEF DESCRIPTION OF THE DRAWINGS

Aspects of the disclosure are illustrated by way of example, and not by limitation, in the accompanying figures in which like reference characters may indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments will be described with reference to the accompanying drawings.

Figure 1:
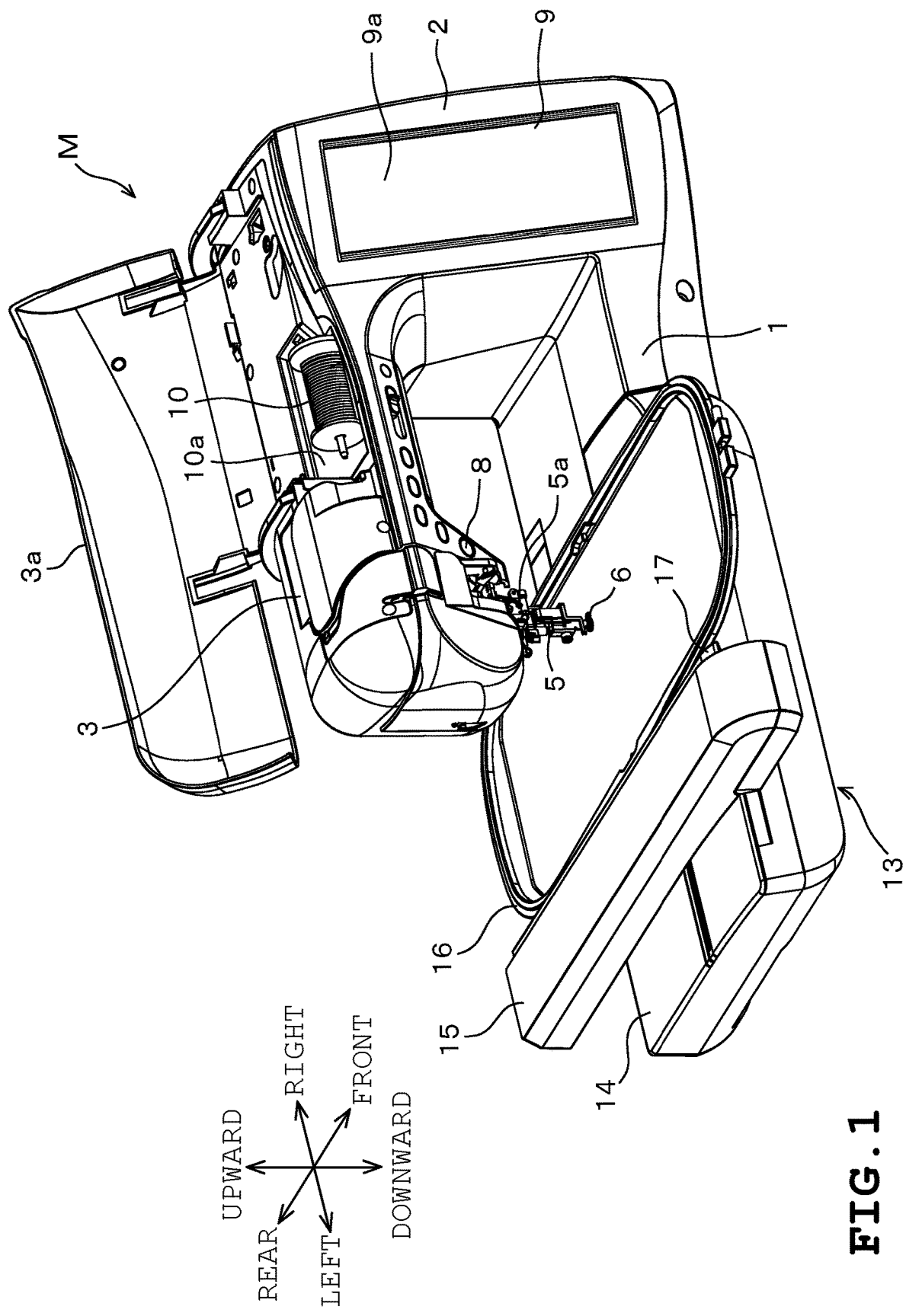
FIG. 1 is an external perspective view of a configuration example of a sewing machine according to one embodiment.

Hereinafter, one embodiment according to the present disclosure is described with reference to the drawings. A sewing machine M exemplified in FIG. 1 integrally includes a bed 1, an upright arm 2, and an arm 3. A spindle, not illustrated, is provided in the arm 3. A machine motor 4 is provided in the upright arm 2. The machine motor 4 rotates a spindle to reciprocate vertically a needle bar 5a to which a sewing needle 5 is attached. A direction from the sewing machine M toward the position of a user is the front direction of the sewing machine M; i.e., an activation and stop switch 8 and a display 9, described later, are provided on a face in this direction. The opposite direction is the rear direction. A side where the upright arm 2 is disposed is the right side of the sewing machine M. The opposite side is the left side.

The arm 3 is provided with a storage 10a for storing a thread spool 10. Needle thread, not illustrated, extending from the thread spool 10 is supplied to the sewing needle 5. The arm 3 is provided with the activation and stop switch 8 for instructing activation and stop of the sewing operation of the sewing machine M. At a lower part of a distal end of the arm 3, that is, at a site facing the bed 1, a camera 11 exemplified in FIG. 2 is provided downward.

The display 9 is provided on the front surface of the upright arm 2. The display 9 may be, for example, a liquid crystal color display. Function names for executing various functions required for the sewing operation, sewing patterns, such as patterns for actual use and embroidery patterns, and setting screens for sewing patterns for these patterns, more specifically, various screens including an outline specification screen G1 and a decoration pattern data generating screen G2, which are described later, are displayed on the display 9. A touch panel 9a exemplified in FIG. 2 is provided on the front surface of the display 9. The touch panel 9a includes plural touch keys made up of transparent electrodes. The touch keys are pressed and operated with a user's finger or a touch pen, not illustrated, thereby allowing selection of the sewing pattern, the decoration pattern, etc., instruction of various functions, and setting of various parameters, etc. Hereinafter, the touch key pressing and operation is called "touch operation".

An embroidery frame transfer device 13 is attached to the bed 1. The embroidery frame transfer device 13 includes a main body 14 and a movable body 15. The movable body 15 is provided with a carriage 17 in a manner movable in the front and rear direction. An embroidery frame 16 that holds a sewing object is detachably attached to the carriage 17. An X-direction feed mechanism that moves the carriage 17 together with the movable body 15 in the right and left direction and is not illustrated, is provided in the main body 14. A Y-direction feed mechanism that moves the carriage 17 in the front and rear direction and is not illustrated, is provided in the movable body 15.

Figure 2:
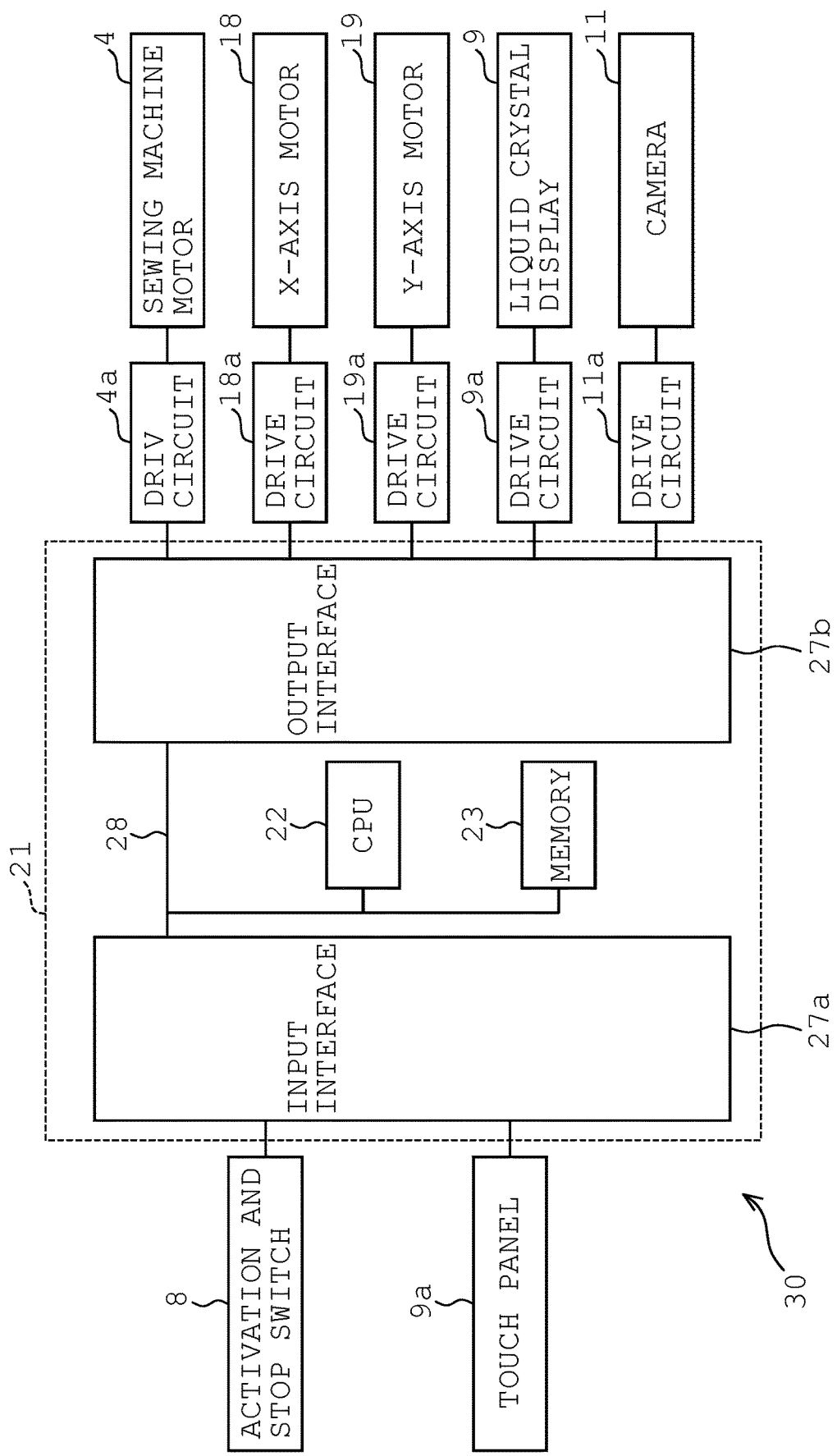
FIG. 2 is a block diagram illustrating the configuration example of the sewing machine.

The X-direction feed mechanism is driven by an X-axis motor 18 exemplified in FIG. 2. The Y-direction feed mechanism is driven by a Y-axis motor 19 exemplified in FIG. 2. More specifically, the embroidery frame transfer device 13 drives an X-axis motor 18 and a Y-axis motor 19 on the basis of embroidery pattern data for sewing an embroidery pattern and of decoration pattern data, described later, thereby causing the X-direction feed mechanism and the Y-direction feed mechanism to move the embroidery frame 16 attached to the carriage 17 in the right and left direction and the front and rear direction.

Next, a configuration example of a control system of the sewing machine M will be described. As exemplified in FIG. 2, a control device 21 mainly configured with a microcomputer, and includes a CPU 22, a memory 23, an input interface 27a, an output interface 27b, and a bus 28 that connects these elements. The activation and stop switch 8 and the touch panel 9a are connected to the input interface 27a. Drive circuits 4a, 18a, 19a, 9a and 11a that drive the sewing machine motor 4, the X-axis motor 18, the Y-axis motor 19, the display 9 and the camera 11, respectively, are connected to the output interface 27b.

The memory 23 stores various types of data, such as embroidery pattern data, outline data, and decoration pattern data. The memory 23 stores various programs, such as a decoration pattern data generating program, a sewing control program, and a display control program. The memory 23 stores a sewing pattern table for decoration patterns used when the decoration pattern data generating program is executed. The embroidery pattern data is data for sewing the embroidery pattern through the sewing machine M. The decoration pattern data generating program is a program for causing a computer to function as various processing sections for generating the decoration pattern data. As described later in detail, the decoration pattern data is data for sewing the decoration pattern in a decoration area set around the embroidery pattern. The display control program is a program for controlling the display 9.

Figure 3:
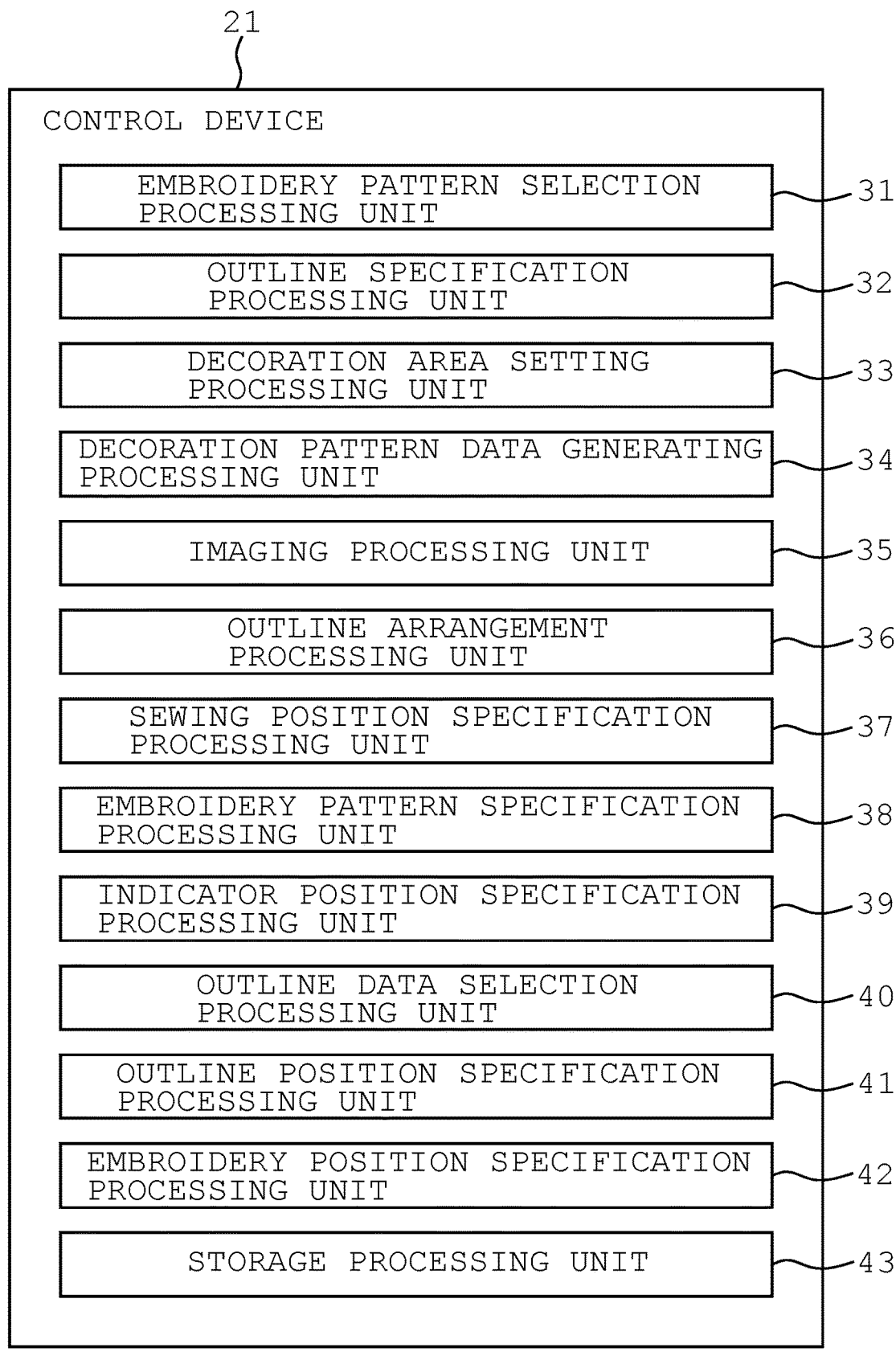
FIG. 3 is a block diagram illustrating a configuration example of a control device.

The control device 21 controls the entire operation of the sewing machine M. The control device 21 is a main configuration element of a decoration pattern data generating apparatus 30 mounted on the sewing machine M. As exemplified in FIG. 3, the control device 21 causes the CPU 22 to execute the control program, thereby virtually achieving, through software, an embroidery pattern selection processing unit 31, an outline specification processing unit 32, a decoration area setting processing unit 33, a decoration pattern data generating processing unit 34, an imaging processing unit 35, an outline arrangement processing unit 36, a sewing position specification processing unit 37, an embroidery pattern specification processing unit 38, an indicator position specification processing unit 39, an outline data selection processing unit 40, an outline position specification processing unit 41, an embroidery position specification processing unit 42, and a storage processing unit 43. The control device 21 includes these processing units made up of hardware, or a combination of software and hardware.

The embroidery pattern selection processing unit 31 is an example of an embroidery pattern selection section, and selects the embroidery pattern to be sewn on the sewing object, on the basis of the user's touch operation on the touch panel 9a. The outline specification processing unit 32 is an example of an outline specification section, and specifies the outline of the embroidery pattern on the basis of the embroidery pattern data for sewing the embroidery pattern selected by the embroidery pattern selection processing unit 31, when an outline key Kb that is described later is operated. That is, the outline specification processing unit 32 specifies the outline that encircles the periphery of the embroidery pattern by adding a set offset value to the external shape of the embroidery pattern specified on the basis of the embroidery pattern data. The outline specification processing unit 32 generates the outline data for reproducing the specified outline.

The decoration area setting processing unit 33 is an example of a decoration area setting section, and sets, as the decoration area, an area outside the outline specified by the outline specification processing unit 32. The decoration pattern data generating processing unit 34 is an example of a decoration pattern data generating section, and generates the decoration pattern data for sewing the decoration pattern in the decoration area set by the decoration area setting processing unit 33. The imaging processing unit 35 is an example of an imaging section, and causes the camera 11 to take an image of the sewing object held by the embroidery frame 16, when a scan key Kd described later is operated. The outline arrangement processing unit 36 is an example of an outline arrangement section, and arranges and displays the outline on an image taken by the imaging processing unit 35 and displayed on the display 9. In a case where plural outline data items are stored in the sewing machine M, the outline arrangement processing unit 36 can arrange the outline reproduced from one outline data item selected from among the plural outline data items, and display the outline on the display 9.

The sewing position specification processing unit 37 is an example of a sewing position specification section, and specifies the sewing position of the embroidery pattern selected by the embroidery pattern selection processing unit 31, on the sewing object. When an operation of adjusting the sewing position of the selected embroidery pattern on the sewing object from the user is accepted, the sewing position specification processing unit 37 specifies the adjusted position as the sewing position of the embroidery pattern.

The embroidery pattern specification processing unit 38 is an example of an embroidery pattern specification section, and specifies the embroidery pattern included in the image taken by the imaging processing unit 35. That is, the embroidery pattern specification processing unit 38 analyzes the image taken by the imaging processing unit 35, thereby extracting the characteristic points of the embroidery pattern included in the image. The embroidery pattern specification processing unit 38 specifies the embroidery pattern included in the image, that is, the embroidery pattern sewn on the sewing object, on the basis of the extracted characteristic points.

The indicator position specification processing unit 39 is an example of an indicator position specification section, and analyzes the image taken by the imaging processing unit 35 to thereby specify whether the indicator serving as the reference of alignment of the outline of the embroidery pattern is included in the image or not. When the indicator is included in the image, the indicator position specification processing unit 39 specifies an indicator adding position on the image. The indicator is made up of a seal member, for example. The user pastes the label in proximity to the sewing object, to which the embroidery pattern is applied. The indicator is used to specify the position of the outline of the embroidery pattern during the decoration pattern sewing, which is described later in detail. In other words, the indicator is used as the reference for arranging the outline of the embroidery pattern. The indicator can be used as the reference for specifying the sewing position of the embroidery pattern during decoration pattern sewing.

The outline data selection processing unit 40 is an example of an outline data selection section. When plural outline data items are stored in the memory 23, this unit can select one outline data item from among the plural outline data items. The outline position specification processing unit 41 is an example of an outline position specification section, and specifies the position of the outline of the embroidery pattern at the sewing position specified by the sewing position specification processing unit 37. The outline position specification processing unit 41 generates outline position data that indicates the specified position of the outline of the embroidery pattern.

The embroidery position specification processing unit 42 is an example of an embroidery position specification section, and specifies the position which is on the image taken by the imaging processing unit 35 and at which the embroidery pattern is sewn, that is, an embroidery position. That is, the embroidery position specification processing unit 42 analyzes the image taken by the imaging processing unit 35, thereby extracting the characteristic points of the embroidery pattern included in the image, for example, a distal end and an edge portion of the embroidery pattern. The embroidery position specification processing unit 42 specifies the sewing position of the embroidery pattern on the basis of the extracted characteristic points. When the embroidery position of the embroidery pattern is specified by the embroidery position specification processing unit 42, the outline arrangement processing unit 36 can arrange and display the outline in conformity with the specified embroidery position.

The storage processing unit 43 is an example of a first storage section, a second storage section, a third storage section and a fourth storage section. The storage processing unit 43 functions as the first storage section, thereby associating specification information that specifies the embroidery pattern selected by the embroidery pattern selection processing unit 31 with the outline data that indicates the outline of the embroidery pattern, and storing the associated information and data in the memory 23. The storage processing unit 43 functions as the second storage section, thereby associating the outline data that indicates the outline specified by the outline specification processing unit 32 with the outline position data that indicates the position of the outline specified by the outline position specification processing unit 41, and storing the associated data in the memory 23.

The storage processing unit 43 functions as the third storage section, thereby associating the outline data that indicates the outline specified by the outline specification processing unit 32 with sewing position data that indicates the sewing position specified by the sewing position specification processing unit 37, and storing the associated data in the memory 23. The storage processing unit 43 functions as the fourth storage section, thereby associating the outline position data that indicates the outline position specified by the outline position specification processing unit 41 with indicator position data that indicates the indicator position specified by the indicator position specification processing unit 39 from a first image taken in a state where the sewing object is held at a first position, and storing the associated data in the memory 23.

The storage processing unit 43 can independently execute the functions of the first storage section, the second storage section, the third storage section and the fourth storage section independently, and can appropriately combine and execute the functions. Repetition of the storage processes by the storage processing unit 43 adds a data group with which each data item is associated is added to the memory 23 as needed.

Next, screens displayed on the display 9 when the decoration pattern data is generated are described. The screens exemplified as follows are examples of the screens displayed on the display 9 by executing the decoration pattern data generating program.

Figure 4:
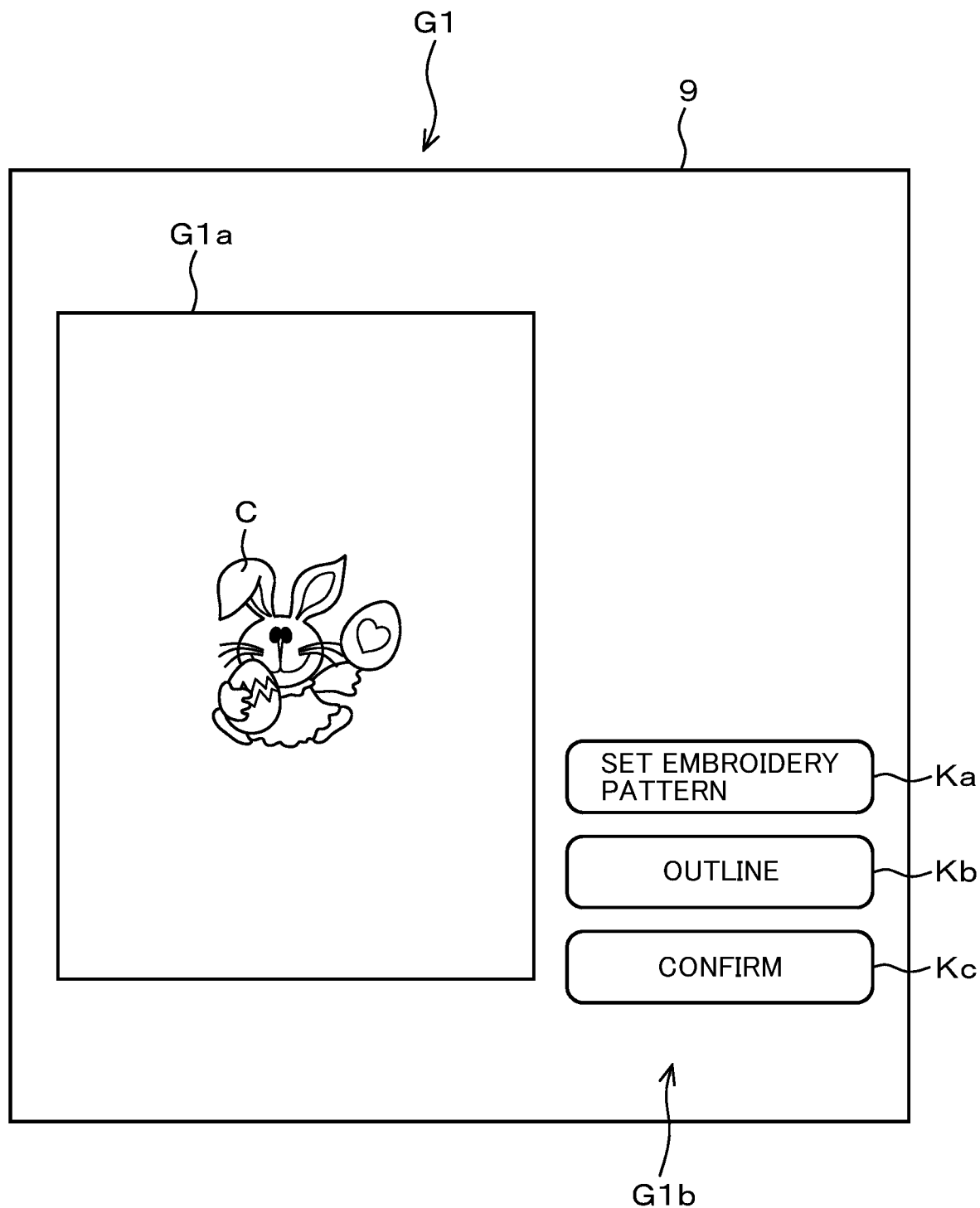
FIG. 4 is a diagram illustrating one example of an outline specification screen for an embroidery pattern (I).

The screen exemplified in FIG. 4 is an example of the outline specification screen G1 of the embroidery pattern. The outline specification screen G1 includes a pattern display area G1*a*, and a key area G1*b*. An embroidery pattern C selected by the user is displayed in the pattern display area G1*a*. The embroidery pattern C displayed in the pattern display area G1*a* can be moved by the user's touch operation or operation of an upward, downward, right and left keys that is provided on the display 9 and is not illustrated. Accordingly, the user can adjust the sewing position of the embroidery pattern C on the sewing object.

An embroidery pattern setting key Ka, the outline key Kb, and a confirmation key Kc are provided in the key area G1*b*. When the embroidery pattern setting key Ka is touch-operated by the user, an embroidery pattern selection screen, not illustrated, is displayed on the display 9. Plural embroidery patterns are displayed on the embroidery pattern selection screen in a selectable manner. When an embroidery pattern is selected on the embroidery pattern selection screen by the user's touch operation, the selected embroidery pattern is displayed on the pattern display area G1a.

When the outline key Kb is touch-operated by the user, the outline data is generated on the basis of the embroidery data on the embroidery pattern C displayed on the pattern display area G1a, and the generated data is stored. As exemplified in FIG. 5, an outline L is displayed around an embroidery pattern C on the basis of the generated outline data. As exemplified in FIG. 5, the outline data is data for reproducing the outline L of the embroidery pattern C set around the embroidery pattern C. The outline specification screen G1 is provided with an offset value input unit which is not illustrated and through which the offset value to be added to the external shape of the embroidery pattern C when the outline L is generated is input. The offset value of the outline L can be adjusted through this unit. That is, input of a smaller offset value generates an outline L closer to the external shape of the embroidery pattern C. On the contrary, input of a larger offset value generates an outline L apart from the external shape of the embroidery pattern C. The outline position data indicating the position of the outline L on the sewing object is stored in association with the outline data on the outline L.

When the confirmation key Kc is touch-operated by the user, the embroidery pattern C to be sewn on the sewing object, and the sewing position of the embroidery pattern C on the sewing object are confirmed. When the sewing is started, the confirmed embroidery pattern C is sewn at the confirmed sewing position.

Figure 6:
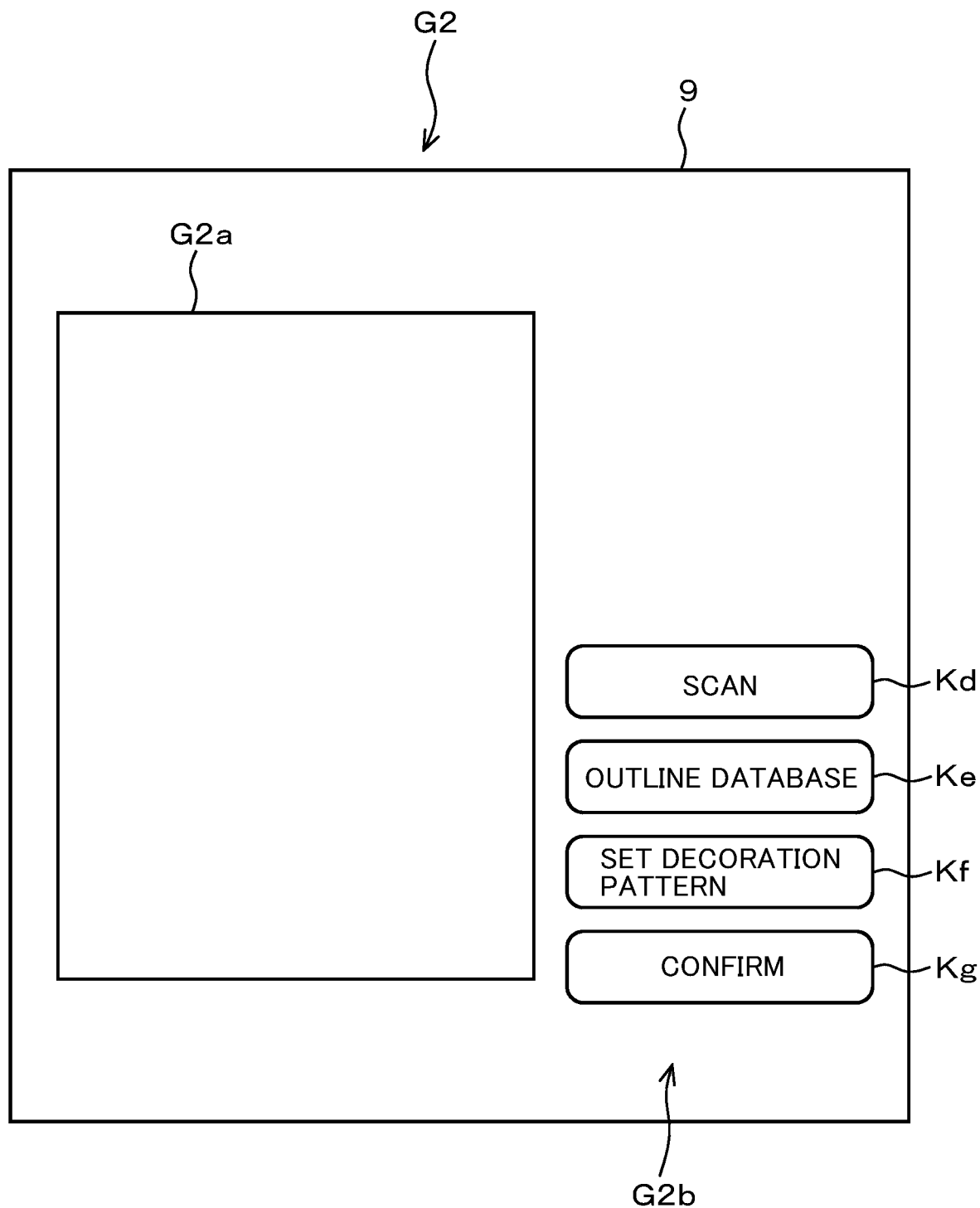
FIG. 6 is a diagram illustrating one example of a decoration pattern data generating screen (I).

The screen exemplified in FIG. 6 is an example of the decoration pattern data generating screen G2. The decoration pattern data generating screen G2 is displayed on the display 9 when the outline key Kb is touch-operated on the outline specification screen G1 and sewing of the embroidery pattern C is completed. The decoration pattern data generating screen G2 includes a pattern display area G2a, and a key area G2b. The pattern display area G1a on the outline specification screen G1, and the pattern display area G2a on the decoration pattern data generating screen G2 are provided so as to have the same size. The coordinates in the horizontal direction and the vertical direction are set at the same scale. That is, it is configured that the coordinate position in the pattern display area G1a on the outline specification screen G1, and the coordinate position in the pattern display area G2a on the decoration pattern data generating screen G2 coincide with each other.

The key area G2b is provided with the scan key Kd, an outline database key Ke, a decoration pattern setting key Kf, and a confirmation key Kg. When the scan key Kd is touch-operated by the user, a process of imaging the sewing object is performed by the camera 11. As exemplified in FIG. 7, the acquired image is displayed as a background image on the pattern display area G2a.

Figure 8:
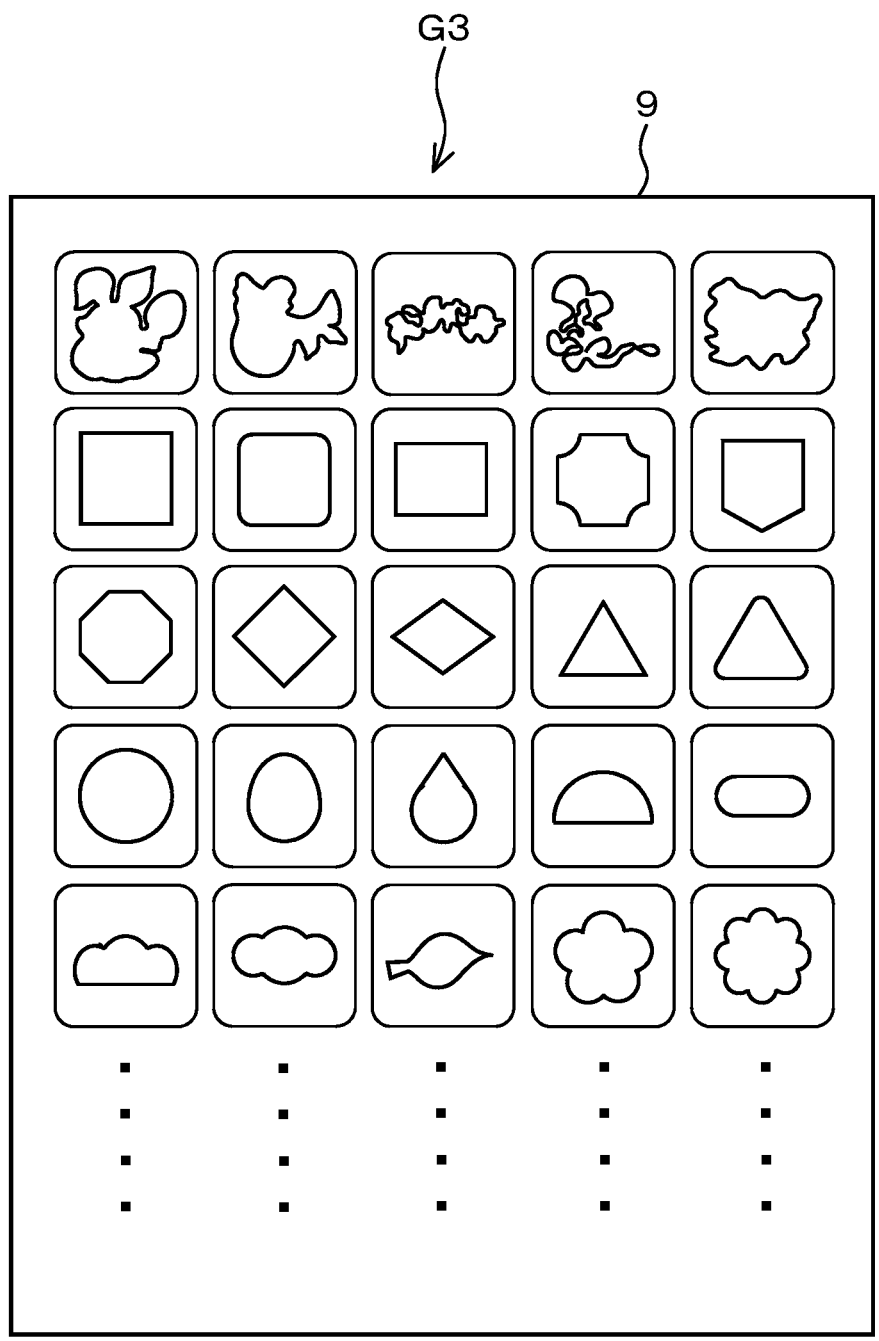
FIG. 8 is a diagram illustrating one example of an outline database screen.

When the outline database key Ke is touch-operated by the user, an outline database screen G3 exemplified in FIG. 8 is displayed on the display 9. Plural outlines reproduced from the stored plural outline data items are selectably displayed in a touch button form on the outline database screen G3. The outlines displayed on the outline database screen G3 include, for example, outlines having been preliminarily stored since the product shipping of the sewing machine M, and also include outlines newly generated on the basis of the touch operation of the outline key Kb described above. That is, the outlines generated by the touch operation of the outline key Kb are added to the outline database as needed. Outlines for plural outer frames are also selectably displayed in a touch button form on the outline database screen G3. The outline for the outer frame is an outline for specifying the outer periphery of the decoration area where the decoration pattern is to be applied.

Figure 9:
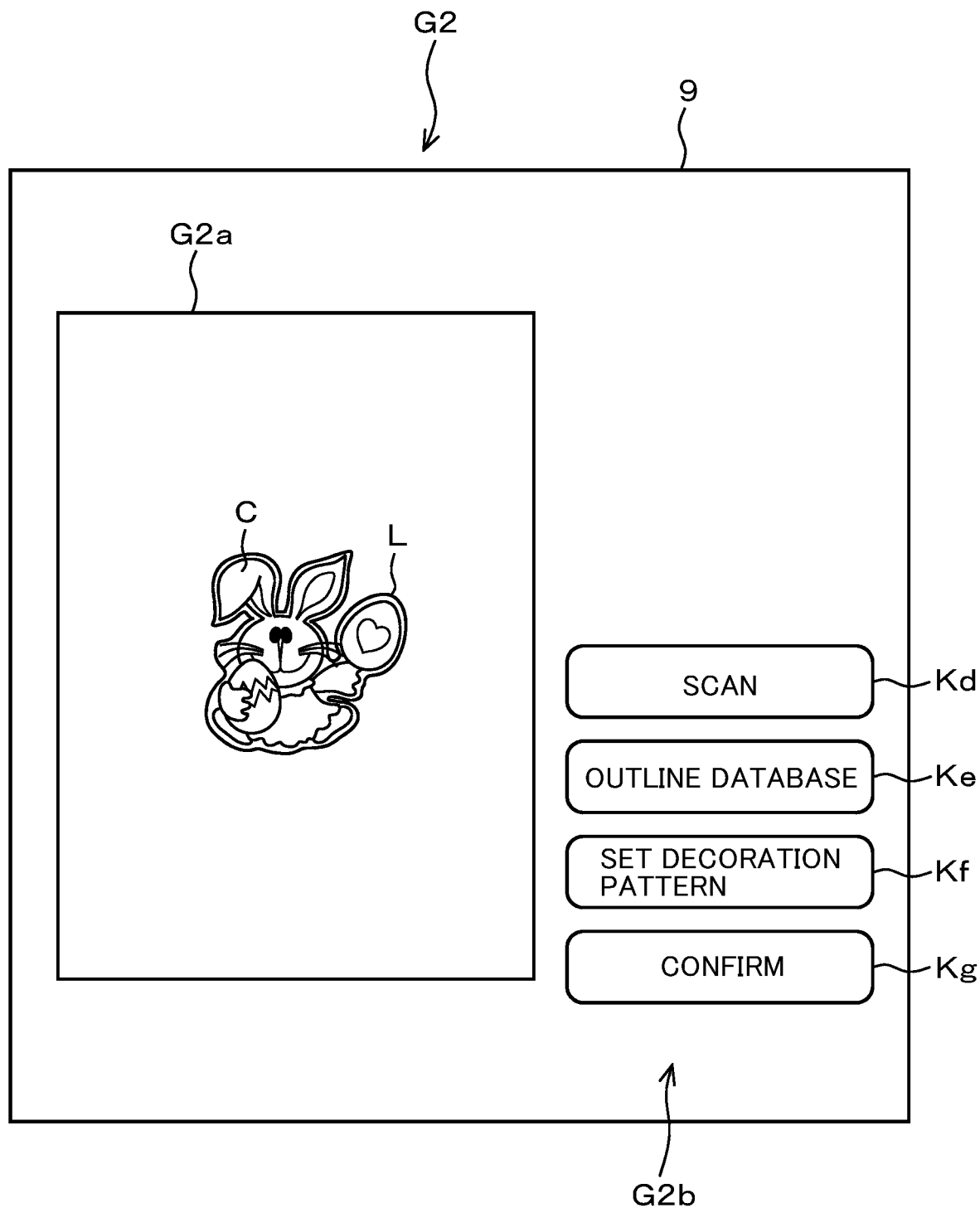
FIG. 9 is a diagram illustrating one example of the decoration pattern data generating screen (III).
Figure 10:
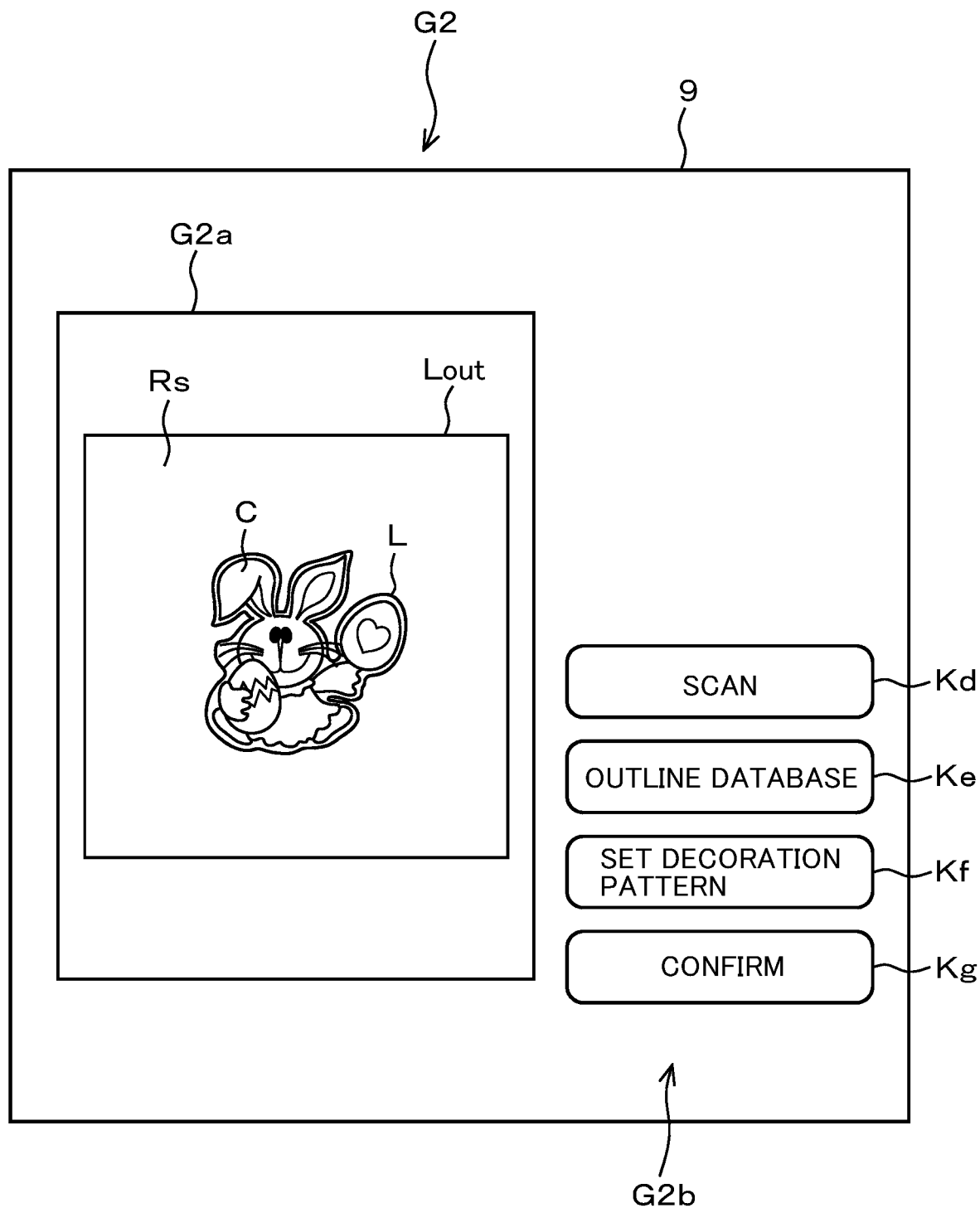
FIG. 10 is a diagram illustrating one example of the decoration pattern data generating screen (IV).

When an outline is selected by the user's touch operation on the outline database screen G3, the selected outline L is displayed on the pattern display area G2a as exemplified in FIG. 9. Here, in a case where the outline position data is stored in association with the outline data on the selected outline L, the outline L is displayed at the position indicated by the outline position data. The outline L displayed on the pattern display area G2a can be moved by the user's touch operation. When the outline for the outer frame is selected by the user's touch operation, the selected outline Lout for the outer frame is displayed on the pattern display area G2a as exemplified in FIG. 10. The outline Lout for the outer frame displayed on the pattern display area G2a can be moved by the user's touch operation. An area between the outline L and the outline Lout for the outer frame displayed on the pattern display area G2a is set as a decoration area Rs where the decoration pattern is to be applied.

Figure 11:
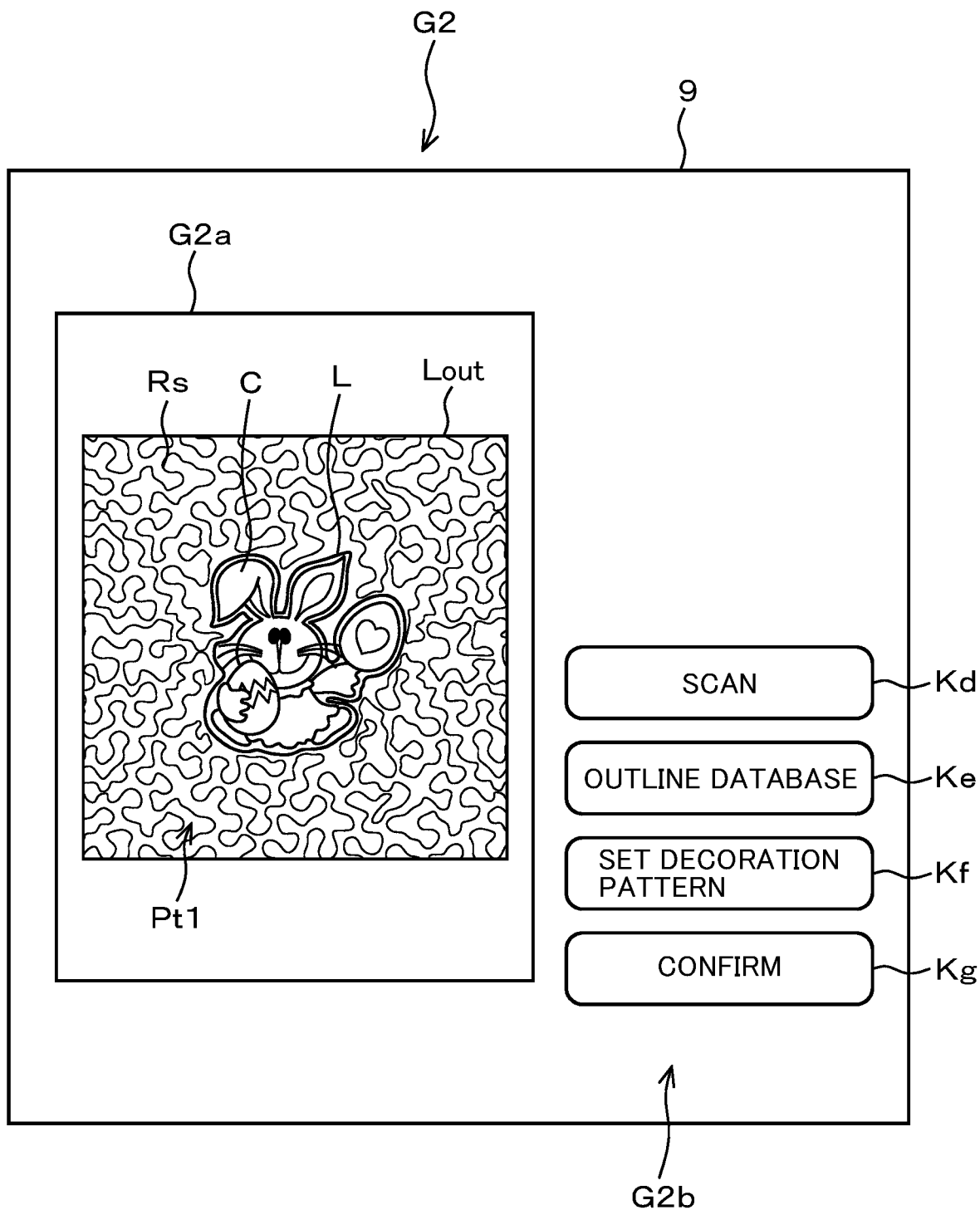
FIG. 11 is a diagram illustrating one example of the decoration pattern data generating screen (V).
Figure 12:
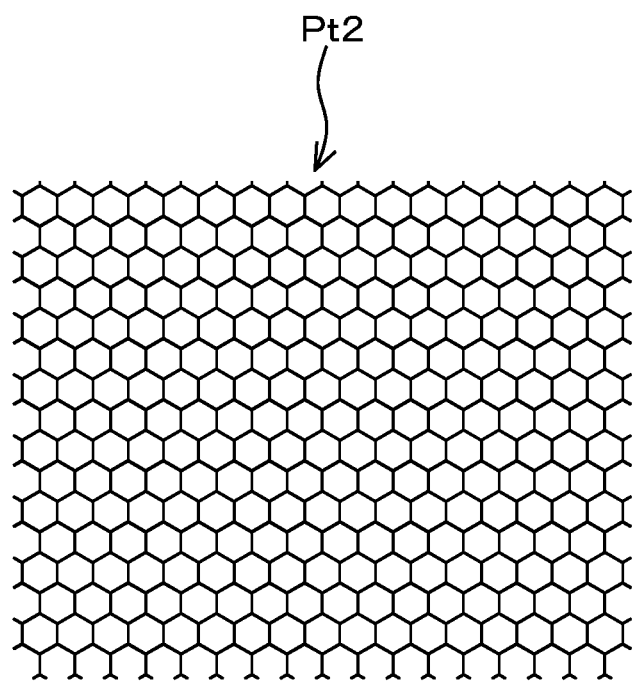
FIG. 12 is a diagram illustrating an example of a decoration pattern.
Figure 12:
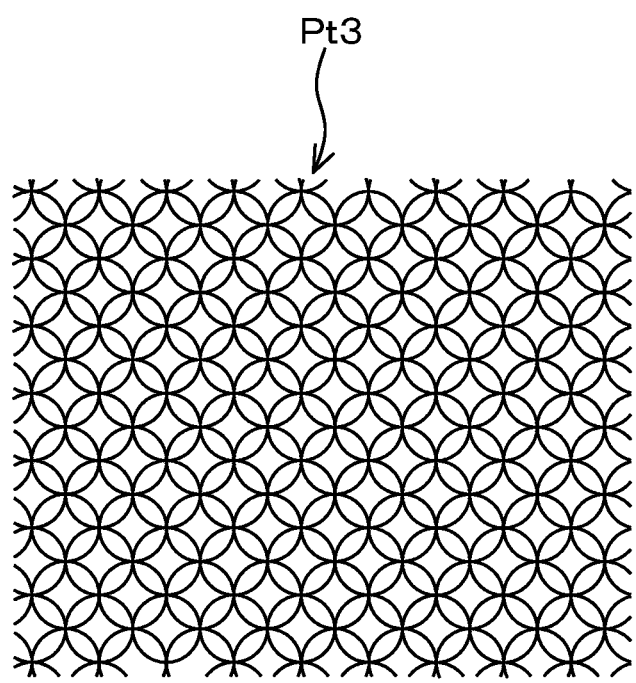

When the decoration pattern setting key Kf is touch-operated by the user, a decoration pattern selection screen, not illustrated, is displayed on the display 9. Plural decoration patterns are displayed on the decoration pattern selection screen in a selectable manner. When a decoration pattern is selected on the decoration pattern selection screen by the user's touch operation, the selected decoration pattern Pt1 is displayed in the decoration area Rs, as exemplified in FIG. 11. The decoration pattern can be selected not only from a stippling pattern exemplified in FIG. 11 but also from among various decoration patterns, such as decoration patterns Pt2 and Pt3, exemplified in FIG. 12. Even after the decoration pattern is displayed in the decoration area, the types and positions of the outline and the outline for the outer frame can be changed. The decoration pattern displayed in the decoration area can also be changed.

When the confirmation key Kg is touch-operated by the user, the decoration area Rs, and decoration pattern data that defines the decoration area Rs and the decoration pattern Pt1 to be applied to the decoration area Rs is generated. When sewing is started, the decoration pattern Pt1 is sewn in the decoration area Rs on the basis of the generated decoration pattern data. In this embodiment, the pattern display area G1a corresponds to an area allowing embroidery in the embroidery frame 16. The arrangement position of the embroidery pattern in the pattern display area G1a corresponds to the sewing position of the embroidery pattern on the sewing object held by the embroidery frame 16. Likewise, the pattern display area G2a corresponds to the area allowing embroidery in the embroidery frame 16. The arrangement position of the decoration pattern in the pattern display area G2a corresponds to the sewing position of the decoration pattern on the sewing object held by the embroidery frame 16.

Next, an example of operations of the sewing machine M mounted with the decoration pattern data generating apparatus 30 is described. Here, a case of generating a sewing object that includes front fabric and back fabric, and batting inserted therebetween is described. The embroidery pattern is applied to the front fabric. The decoration pattern is applied around the embroidery pattern on the sewing object.

First, the sewing operation of the embroidery pattern is described. As exemplified in FIG. 13, when the control device 21 accepts, on the outline specification screen G1, an operation of selecting the embroidery pattern to be sewn on the front fabric (A1), this device displays the selected embroidery pattern on the pattern display area G1a, as illustrated in FIG. 4. The control device 21 accepts an operation of adjusting the sewing position of the selected embroidery pattern on the front fabric, and sets the sewing position of the embroidery pattern (A2). The control device 21 monitors whether the outline key Kb is operated or not (A3).

Figure 5:
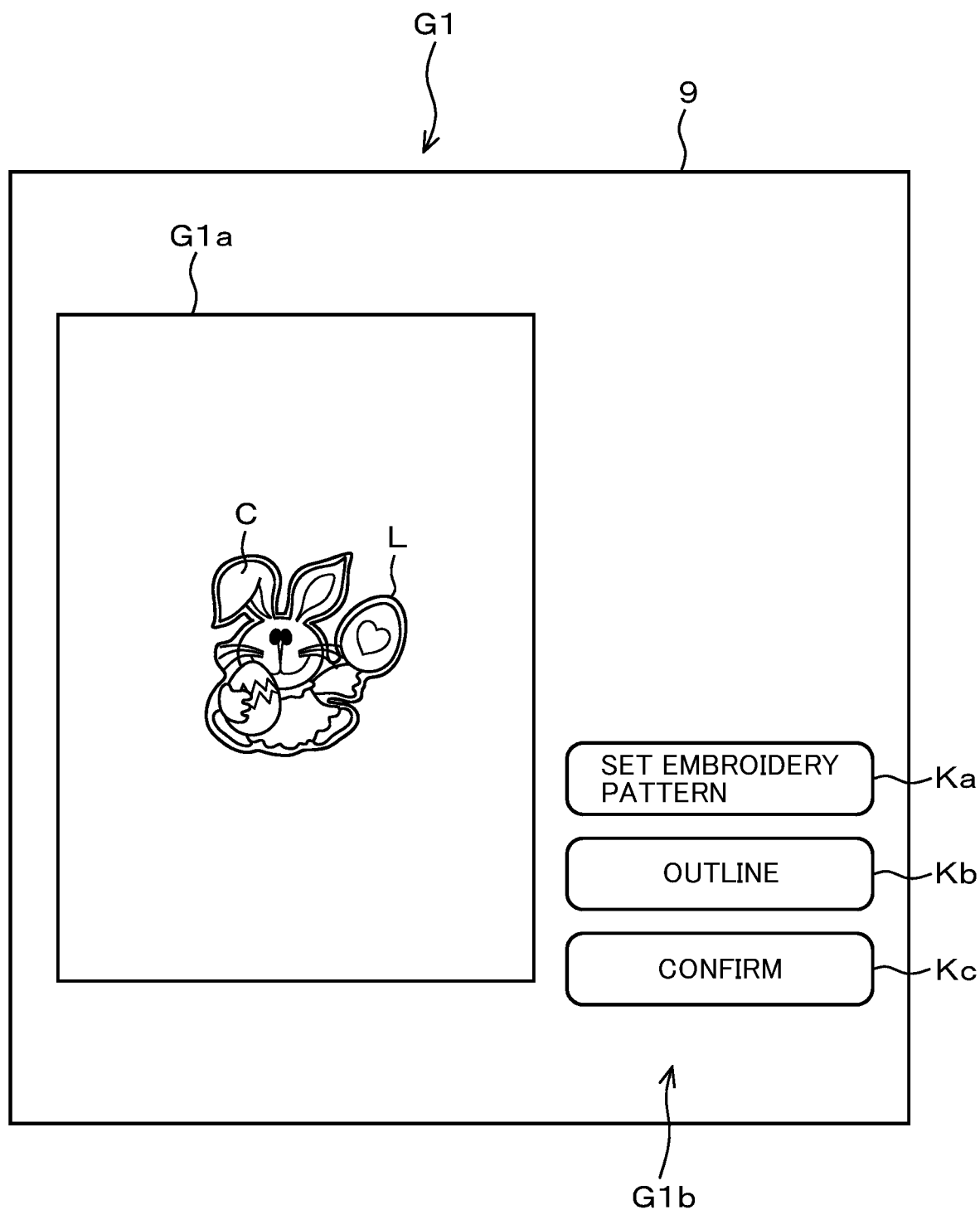
FIG. 5 is a diagram illustrating one example of the outline specification screen for the embroidery pattern (II).

If the outline key Kb is operated (A3: YES), the control device 21 specifies the outline of the embroidery pattern on the basis of the embroidery pattern data for sewing the selected embroidery pattern (A4). The control device 21 generates the outline data for reproducing the specified outline (A5). As illustrated in FIG. 5, the control device 21 displays the specified outline L around the embroidery pattern. The control device 21 specifies the position of the outline that encircles the embroidery pattern disposed at the sewing position set at step A2, and generates the outline position data that indicates the position of the outline (A6).

The control device 21 stores, in the memory 23, the outline data, the outline position data, and the specification information specifying the selected embroidery pattern in association with one another (A7), and the processing transitions to step A8. That is, at this time, the storage processing unit 43 functions as the first storage section and the second storage section. The specification information that specifies the embroidery pattern may be information that indicates the characteristic points of the embroidery pattern, or an image that indicates the embroidery pattern itself. If the outline key Kb is not operated (A3: NO), the control device 21 does not execute steps A4 to A7, and the processing transitions to step A8. The control device 21 may be configured so as not to store the outline position data at step A7. In this case, step A6 can be omitted.

After the processing transitions to step A8, the control device 21 monitors whether or not the activation and stop switch 8 is operated and the sewing start is input. If the sewing start is input (A8: YES), the control device 21 executes sewing of the selected embroidery pattern (A9). If the sewing start is not input in a predetermined sewing start wait time (A8: NO), the control device 21 causes the processing to transition to step A3. The sewing start wait time can be appropriately changed and set. The control device 21 may be configured so that if the sewing start is not input in the predetermined sewing start wait time (A8: NO), the processing can transition to step A1, and this device can additionally select the embroidery pattern that is a processing target.

When the control device 21 completes sewing of the selected embroidery pattern, this device confirms whether the outline of the sewn embroidery pattern is specified or not, that is, whether the process at step A4 has been performed or not (A10). If the control device 21 has specified the outline of the sewn embroidery pattern (A10: YES), this device displays the decoration pattern data generating screen G2 as illustrated in FIG. 6 and monitors whether the scan key Kd is touch-operated or not (A11). If the scan key Kd is touch-operated (A11: YES), the control device 21 takes an image of processing target fabric, which is front fabric in this case (A12). The user may add the indicator on the front fabric without removing the front fabric from the embroidery frame 16 after completion of the embroidery pattern sewing and before the front fabric imaging by the camera 11.

The control device 21 analyzes the taken image, thereby confirming whether the indicator is included in the image or not (A13). More specifically, for example, the control device 21 preliminarily stores, in the memory 23, the information indicating the characteristic points of the indicator. The control device 21 may then analyze the taken image, and determine that the indicator is included in the image if the same characteristic point as the stored characteristic point is included in the image.

If the indicator is included in the image (A13: YES), the control device 21 specifies the position of the indicator in the image as the adding position (A14). The control device 21 generates the indicator position data that indicates the indicator adding position on the sewing object (A15). The control device 21 stores the outline position data and the indicator position data in association with each other (A16). At this time, the storage processing unit 43 functions as the fourth storage section. Accordingly, the positional relationship between the position of the outline of the embroidery pattern and the indicator adding position is stored. That is, the control device 21 stores the positional relationship between the indicator adding position in the first image taken in a state where the front fabric serving as the sewing object is held by the embroidery frame 16 at the first position, and the position of the outline of the embroidery pattern.

If the control device 21 has not specified the outline of the embroidery pattern (A10: NO), or if the indicator is not included in the image (A13: NO), this device finishes the sewing operation of the embroidery pattern without executing steps A11 and A12 or steps A14 to A16.

Next, the sewing operation of the decoration pattern is described. Before start of the sewing operation of the decoration pattern, the user removes the front fabric where the embroidery pattern is sewn from the embroidery frame 16 after the sewing operation of the embroidery pattern described above. The user inserts batting between the front fabric and back fabric, which is not illustrated, causes the embroidery frame 16 to hold them, and mounts the embroidery frame 16 on the carriage 17. The sewing operation of the decoration pattern is the sewing operation to be performed in this state, and is for sewing the decoration pattern around the embroidery pattern. The decoration pattern is applied for decoration, while having a function of sewing the front fabric and the back fabric with the batting intervening therebetween. Hereinafter, the sewing object where the batting intervenes between the front fabric and the back fabric is called processing target fabric.

As described above, the front fabric is removed from the embroidery frame 16, and is held again by the embroidery frame 16 as a part of the processing target fabric. Accordingly, the holding position of the front fabric with respect to the embroidery frame 16 is sometimes different between the case of sewing the embroidery pattern and the case of sewing the decoration pattern. In consideration of such a problem, in this embodiment, as described later, an image of the processing target fabric held by the embroidery frame 16 is taken during decoration pattern sewing, the position of the embroidery pattern sewn on the front fabric is specified, and subsequently, the decoration pattern is sewn around the embroidery pattern.

Figure 7:
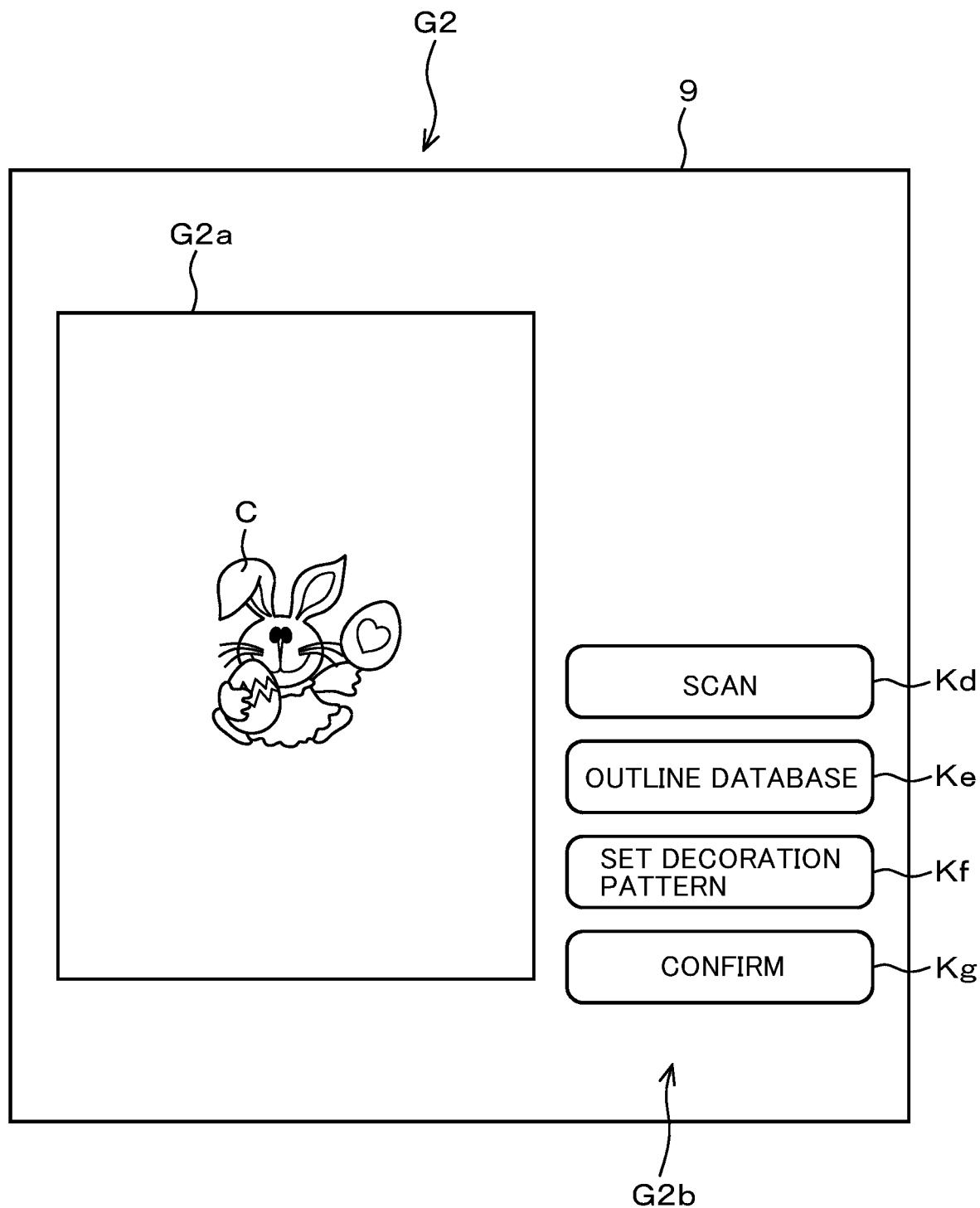
FIG. 7 is a diagram illustrating one example of the decoration pattern data generating screen (II).
Figure 14A:
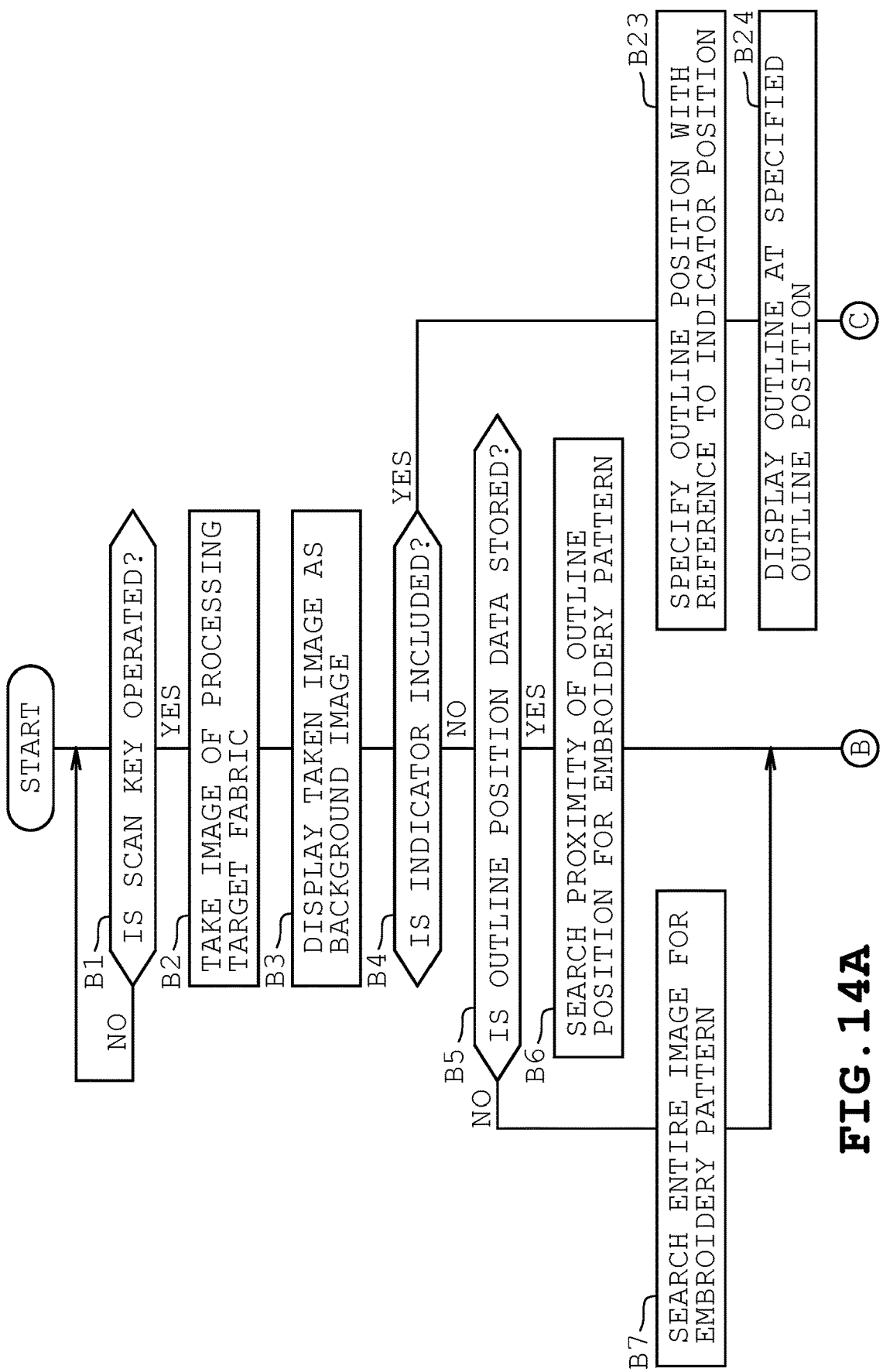
FIG. 14A is a flowchart illustrating one example of the sewing operation of the decoration pattern (I-A).
Figure 14B:
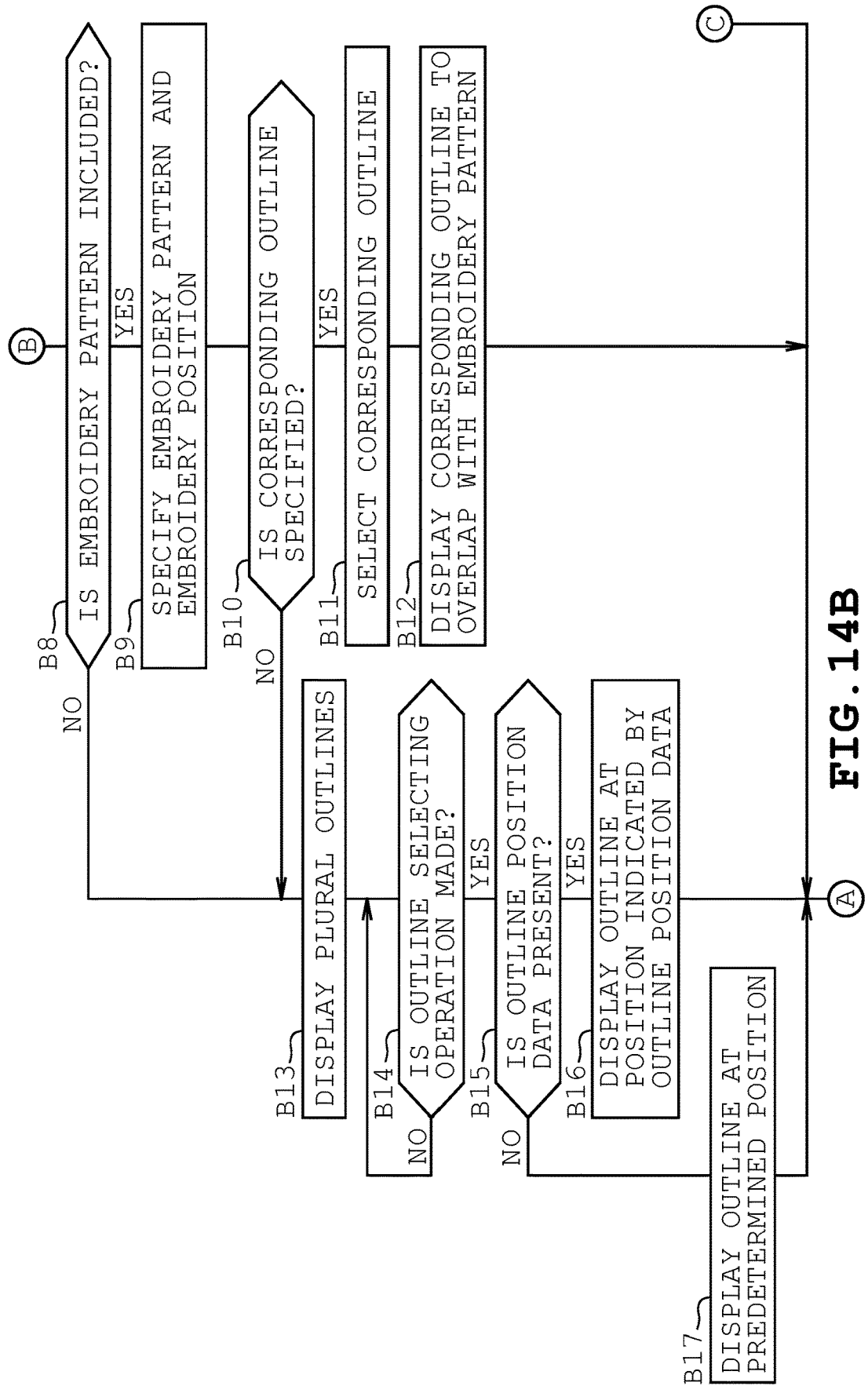
FIG. 14B is a flowchart illustrating one example of the sewing operation of the decoration pattern (I-B).

As exemplified in FIG. 14A, 14B, when the scan key Kd is operated on the decoration pattern data generating screen G2 by the user (B1: YES), the control device 21 causes the camera 11 to take an image of the processing target fabric (B2). As illustrated in FIG. 7, the control device 21 displays the taken image as the background image, on the display 9 (B3). The control device 21 analyzes the taken background image, thereby confirming whether the indicator is included in the background image or not (B4). If the indicator is not included in the background image (B4: NO), the control device 21 confirms whether the outline position data has been stored in the memory 23 at step A7 described above or not (B5).

If the outline position data is stored (B5: YES), the control device 21 analyzes the proximity of the position indicated by the outline position data in the background image, thereby searching for the embroidery pattern in the background image (B6). If the outline position data is not stored (B5: NO), the control device 21 analyzes the entire background image, thereby searching for the embroidery pattern in the background image (B7). The control device 21 may search the background image for the embroidery pattern specified by the specification information stored at step A7. More specifically, the control device 21 may determine whether any of characteristic points of the embroidery pattern stored in the memory 23 is included in the background image or not, thus searching for the embroidery pattern. If plural outline position data items are stored, the control device 21 may analyze the plural positions indicated by the outline position data items, that is, search for the embroidery pattern.

More specifically, according to the process of searching for the embroidery pattern at step B6, the configuration is adopted that analyzes the proximity of the position indicated by the outline position data in the background image to thereby search the background image for the embroidery pattern. Accordingly, in comparison with the case of analyzing the entire background image, the processing load on the control device 21 is reduced.

The control device 21 determines whether the embroidery pattern is included in the background image or not according to the search result at steps B6 or B7 (B8). If any of the characteristic points of the embroidery pattern stored in the memory 23 is included in the background image, the control device 21 makes an affirmative determination (B8: YES), and specifies the embroidery pattern and the position in the background image at which this embroidery pattern is sewn, i.e., the embroidery position (B9). The control device 21 confirms whether the outline data on the outline corresponding to the embroidery pattern included in the background image is stored in the memory 23 or not (B10). If the control device 21 determines that the corresponding outline data is stored (B10: YES), this device selects the corresponding outline data item from among the plural outline data items stored in the memory 23 (B11).

As illustrated in FIG. 9, the control device 21 displays the outline reproduced from the selected outline data item in a manner overlapping the embroidery pattern, on the basis of the embroidery position of the embroidery pattern specified at step B9 (B12). More specifically, the outline may be disposed and displayed so that the center of the rectangle where the outline specified by the outline data is inscribed can coincide with the center of the rectangle where the embroidery pattern in the background image is inscribed.

If the control device 21 determines that the embroidery pattern is not included in the background image (B8: NO) or if the outline data corresponding to the embroidery pattern included in the background image is not stored (B10: NO), this device displays the outline reproduced by the stored plural outline data items, as a candidate, on the outline database screen G3 (B13). The plural outline candidates may be configured to be displayed through displaying the outline database screen G3 on condition that the outline database key Ke is operated, or configured to be displayed through automatically displaying the outline database screen G3 if the corresponding outline data item is not stored. An example of a case of a negative determination at step B8 may be a case where the characteristic points of the embroidery pattern cannot be extracted from the background image owing to the imaging condition during background image taking, for example, ambient environment light, even though the embroidery pattern is included in the background image.

In a case where plural outline candidates are displayed, when the control device 21 accepts an operation of selecting an outline (B14: YES), this device confirms whether the outline position data is associated with the selected outline or not (B15). If the outline position data is associated (B15: YES), the control device 21 displays the selected outline at the position indicated by the outline position data (B16). If the outline position data is not associated (B15: NO), the control device 21 displays the selected outline at a predetermined position having preliminarily been defined, for example, the center position of the image (B17).

Figure 15:
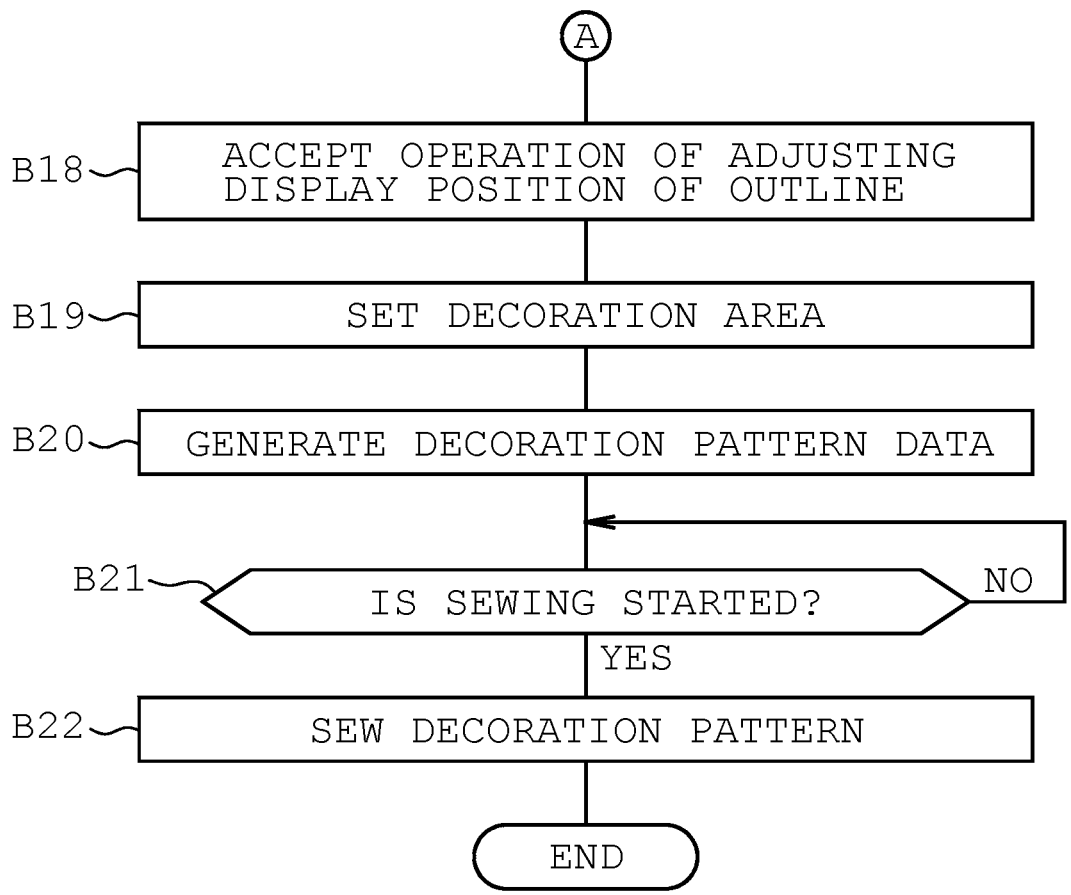
FIG. 15 is a flowchart illustrating one example of the sewing operation of the decoration pattern (II).

As exemplified in FIG. 15, the control device 21 accepts an operation of adjusting the display position of the outline (B18). The control device 21 accepts the selection of the outline Lout for the outer frame, and sets, as the decoration area, an area that is outside the outline of the embroidery pattern and is inside the outline Lout for the outer frame (B19). The control device 21 generates the decoration pattern data for sewing the decoration pattern in the set decoration area (B20). The control device 21 monitors whether or not the activation and stop switch 8 is operated and the sewing start is input. Upon input of the sewing start (B21: YES), the control device 21 executes the decoration pattern sewing on the basis of the generated decoration pattern data (B22). Upon completion of sewing, this device finishes the sewing operation of the decoration pattern.

The control device 21 stores the corresponding outline data (B10: YES). When the outline reproduced by the outline data is displayed so as to overlap the embroidery pattern in the background image (B11 and B12), the processing transitions to step B18. If the indicator is included in the background image (B4: YES), the control device 21 specifies the position of the outline of the embroidery pattern from the stored positional relationship, with reference to the position of the indicator (B23). That is, the control device 21 specifies the position of the outline of the embroidery pattern in a second image taken in a state where the sewing object is held by the embroidery frame 16 at a second position different from the first position, by aligning the indicator adding position in the second image and the indicator adding position in the first image with each other, on the basis of the indicator positional relationship. The control device 21 then displays the outline at the specified outline position (B24), and the processing transitions to step B18. Accordingly, as illustrated in FIG. 9, the outline is displayed so as to overlap with the embroidery pattern included in the background image.

According to this embodiment, the decoration pattern data generating apparatus 30 specifies the outline of the embroidery pattern on the basis of the embroidery pattern data on the embroidery pattern to be sewn, and sets the specified area outside the outline as the decoration area where the decoration pattern is applied. According to this configuration, the decoration area can be set on the basis of the outline of the embroidery pattern obtained from the embroidery pattern data, and can more accurately set the decoration area than the conventional method of manually drawing the outline of the embroidery pattern can.

According to this embodiment, the decoration pattern data generating apparatus 30 takes an image of the sewing object where the selected embroidery pattern is sewn, disposes the outline on the taken image, and sets the area outside the outline arranged on the image, as the decoration area. According to this configuration, the user can confirm the decoration pattern area in a state of being overlapped on the image of the actual sewing object, and can generate the decoration pattern data while visually confirming the image after sewing.

According to this embodiment, the decoration pattern data generating apparatus 30 can select the outline to be disposed from among plural outlines. According to this configuration, the outline suitable to the embroidery pattern can be selected from among the plural outlines.

In a case where a configuration of disposing the outline selected from among the plural outlines is adopted, the decoration pattern data generating apparatus 30 may adopt the following configuration. That is, the decoration pattern data generating apparatus 30 stores the specification information that specifies the selected embroidery pattern, and the outline data that indicates the outline of the embroidery pattern, in association with each other. In a case where the outline is disposed so as to overlap the embroidery pattern, the decoration pattern data generating apparatus 30 selects the outline data item stored in association with the specification information on the same embroidery pattern as the specified embroidery pattern. According to this configuration, the outline corresponding to the sewn embroidery pattern can be selected and displayed.

The decoration pattern data generating apparatus 30 specifies the position of the embroidery pattern in the taken image, and disposes the selected outline on the basis of the position of the selected embroidery pattern. According to this configuration, the selected outline can be automatically disposed at the position of the embroidery pattern.

The decoration pattern data generating apparatus 30 stores the outline data that indicates the specified outline, and the outline position data that indicates the position of this outline, in association with each other. When the decoration pattern data generating apparatus 30 disposes the outline so as to overlap the embroidery pattern, this apparatus disposes the outline indicated by the selected outline data, at the position indicated by the outline position data associated with the selected outline data. According to this configuration, the selected outline can be automatically disposed at the position where the outline is generated, that is, the sewing position of the embroidery pattern.

According to this embodiment, the decoration pattern data generating apparatus 30 associates the position of the indicator during embroidery pattern sewing with the position of the indicator during decoration pattern sewing, thereby specifying the position of the outline during decoration pattern sewing from the relationship between the positions of the outline and the indicator during embroidery pattern sewing. The decoration pattern data generating apparatus 30 displays the outline so as to overlap the position of the specified embroidery pattern. According to this configuration, the position where the outline is disposed during decoration pattern sewing can be accurately specified, even if the position of the embroidery pattern deviates between the position during embroidery pattern sewing in which the embroidery pattern is sewn on the front fabric and the subsequent position during decoration pattern sewing in which the front fabric and back fabric and the batting intervening therebetween are sewn together with the decoration pattern. Consequently, the decoration pattern area provided around the embroidery pattern can be accurately set, which can make the final finishing of the sewing object favorable.

The present disclosure is not limited only to the embodiments described above. The following modification and enhancement can be made.

Figure 13:
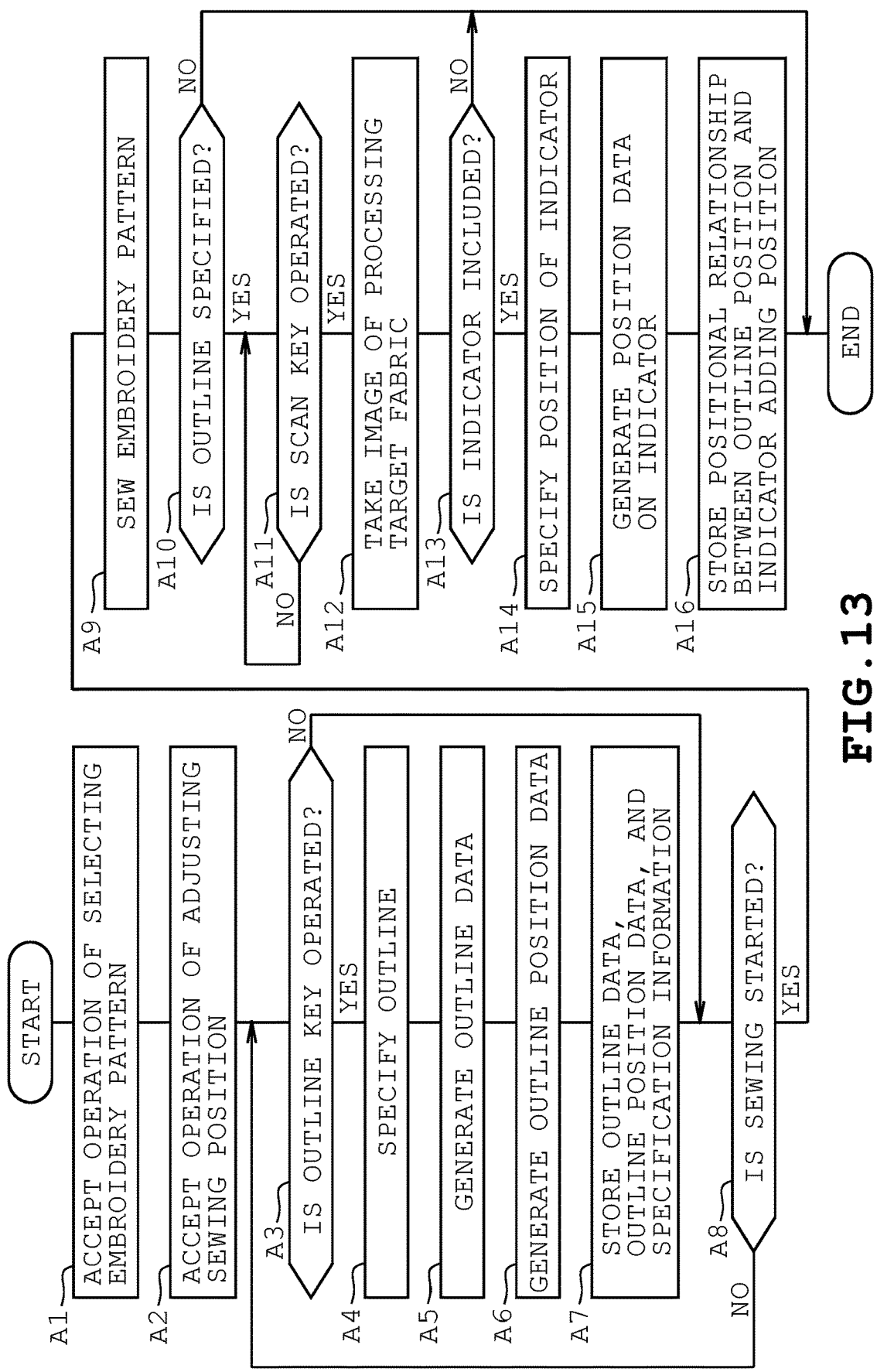
FIG. 13 is a flowchart illustrating one example of a sewing operation of the embroidery pattern.

For example, the decoration pattern data generating apparatus 30 may have a configuration where the processes at steps A10 to A16 in the flow of the sewing operation of the embroidery pattern exemplified in FIG. 13, and the processes at steps B4, B23 and B24 in the sewing operation of the decoration pattern exemplified in FIG. 14A,14B are not performed. In this case, upon completion of the process at step A9, the decoration pattern data generating apparatus 30 finishes the sewing operation of the embroidery pattern. Upon completion of the process at step B3, the processing transitions to step B5.

The decoration pattern data generating apparatus 30 may have a configuration where the processes at steps A10 to A16 in the flow of the sewing operation of the embroidery pattern exemplified in FIG. 13, and the processes at steps B4 to B12, B23 and B24 in the sewing operation of the decoration pattern exemplified in FIG. 14A,14B are not performed. In this case, upon completion of the process at step A9, the decoration pattern data generating apparatus 30 finishes the sewing operation of the embroidery pattern. Upon completion of the process at step B3, the processing transitions to step B13.

Alternatively, a configuration may be adopted where composite data for sewing the embroidery pattern and the decoration pattern at the same time is generated. In this case, the need to align the outline using the indicator can be negated. The decoration pattern data generating apparatus 30 is not limited to the configuration provided in the sewing machine M. For example, the apparatus may be an apparatus main body made up of a personal computer and the like, that is, a dedicated machine for generating the embroidery pattern data. In a case where the sewing machine M and the decoration pattern data generating apparatus 30 are separately provided, the sewing machine M and the decoration pattern data generating apparatus 30 may be wiredly or wirelessly connected to each other to transmit and receive data.

For example, it may be configured such that an area inside or on the outline can be sewn with the decoration pattern, only if at least the decoration area can be sewn with the decoration pattern. Instead of the process at step B12, a process may be performed that displays the outline reproduced by the outline data corresponding to the embroidery pattern specified at step B9 at the position indicated by the outline position data stored in association with the outline data. The indicator may be an indicator that can specify not only the position but also the inclination. When the indicator is detected at step B4, the inclination of the outline can also be adjusted in conformity with the inclination of the indicator.

At step A7, the decoration pattern data generating apparatus 30 may store the sewing position data indicating the sewing position of the embroidery pattern set at step A2, instead of the outline position data. At this time, the storage processing unit 43 functions as the third storage section, and stores the outline data indicating the specified outline and the sewing position data indicating the sewing position, in the memory 23, in association with each other. The decoration pattern data generating apparatus 30 performs the processes, with the outline position data being replaced with the sewing position data, in the processing thereafter. At step B6, the decoration pattern data generating apparatus 30 searches the proximity of the position indicated by the stored sewing position data, for the embroidery pattern. At step B16, this apparatus disposes the outline indicated by the selected outline data at the position indicated by the sewing position data associated with the selected outline data. According to this configuration, the selected outline can be automatically disposed around the sewing position of the embroidery pattern corresponding to the outline.

The non-transitory recording medium that records the decoration pattern data generating program is not limited to the memory 23. For example, any of recording media, such as a CD-ROM, a flexible disk, a DVD and a memory card, may be adopted. In this case, the program in the recording medium is read into a computer, such as a dedicated machine, and executed, thereby exerting operations and advantageous effects analogous to those in the embodiments described above.

In the embodiments described above, a single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

The invention claimed is:

1. A decoration pattern data generating apparatus, comprising:
a controller configured to control the decoration pattern data generating apparatus to:
select an embroidery pattern to be sewn;
specify an outline of the embroidery pattern, based on embroidery pattern data for sewing the selected embroidery pattern;
take an image of a sewing object where the selected embroidery pattern is sewn;
arrange the specified outline on the taken image;
set an area outside the arranged outline, as a decoration area; and
generate decoration pattern data for sewing a decoration pattern in the set decoration area.

2. The decoration pattern data generating apparatus according to claim 1,
the controller being configured to further control the decoration pattern data generating apparatus to:
store plural outline data items that indicate the outline of the embroidery pattern;
select one outline data item from among the stored plural outline data items; and
arrange the outline indicated by the selected outline data item.

3. The decoration pattern data generating apparatus according to claim 2,
the controller being configured to further control the decoration pattern data generating apparatus to:
store specification information that specifies the selected embroidery pattern, and the outline data item that indicates the outline of the embroidery pattern, in association with each other;
specify the embroidery pattern included in the taken image; and
select the outline data item stored in association with the specification information on the embroidery pattern identical to the specified embroidery pattern.

4. The decoration pattern data generating apparatus according to claim 3,
the controller being configured to further control the decoration pattern data generating apparatus to:
specify a position of the embroidery pattern in the taken image; and
arrange the outline indicated by the selected outline data item, based on the specified position.

5. The decoration pattern data generating apparatus according to claim 2,
the controller being configured to further control the decoration pattern data generating apparatus to:
specify a sewing position of the embroidery pattern on the sewing object;
specify a position of the outline of the embroidery pattern at the specified sewing position;
store the outline data item that indicates the specified outline, and outline position data that indicates the position of the specified outline, in association with each other; and
arrange the outline indicated by the selected outline data item, at the position indicated by the outline position data associated with the selected outline data item, when the stored outline data item is selected.

6. The decoration pattern data generating apparatus according to claim 2,
the controller being configured to further control the decoration pattern data generating apparatus to:
specify a sewing position of the embroidery pattern on the sewing object;
store the outline data item that indicates the specified outline, and sewing position data that indicates the position of the specified sewing position, in association with each other; and
arrange the outline indicated by the selected outline data item, at the position indicated by the sewing position data associated with the selected outline data item, when the stored outline data item is selected.

7. The decoration pattern data generating apparatus according to claim 2,
the controller being configured to further control the decoration pattern data generating apparatus to:
specify a sewing position of the embroidery pattern on the sewing object;
specify a position of the outline of the embroidery pattern at the specified sewing position;
specify a position of an indicator serving as a reference of arrangement of the outline, from the taken image;
store outline position data that indicates the specified position of the outline, and indicator position data that indicates the position of the indicator specified from a first image taken in a state where the sewing object is held at a first position, in association with each other; and
combine the position of the indicator in a second image taken in a state where the sewing object is held at a second position different from the first position, and the position of the indicator indicated by the stored indicator position data, to specify an arrangement position of the outline in the second image, and arrange the outline at the specified arrangement position.

8. A sewing machine, comprising:
a decoration pattern data generating apparatus mounted on the sewing machine, the decoration pattern data generating apparatus, comprising:
a controller, the controller being configured to control the decoration pattern data generating apparatus to:
select an embroidery pattern to be sewn;
specify an outline of the embroidery pattern, based on embroidery pattern data for sewing the selected embroidery pattern;
take an image of a sewing object where the selected embroidery pattern is sewn;
arrange the specified outline on the taken image;
set an area outside the arranged outline, as a decoration area; and
generate decoration pattern data for sewing a decoration pattern in the set decoration area.

9. A non-transitory recording medium storing instructions for a computer having a controller, the instructions causing, when executed by the controller, the computer to perform steps comprising:
selecting an embroidery pattern to be sewn;
specifying an outline of the embroidery pattern, based on embroidery pattern data for sewing the selected embroidery pattern;
taking an image of a sewing object where the selected embroidery pattern is sewn;
arranging the specified outline on the taken image;
setting an area outside the arranged outline, as a decoration area; and
generating decoration pattern data for sewing a decoration pattern in the set decoration area.

10. The non-transitory recording medium according to claim 9,
the instructions further cause, when executed by the controller, the computer to:
store plural outline data items that indicate the outline of the embroidery pattern;
select one outline data item from among the stored plural outline data items; and
arrange the outline indicated by the selected outline data item.

11. The non-transitory recording medium according to claim 10,
the instructions further cause, when executed by the controller, the computer to:
store specification information that specifies the selected embroidery pattern, and the outline data item that indicates the outline of the embroidery pattern, in association with each other;
specify the embroidery pattern included in the taken image; and
select the outline data item stored in association with the specification information on the embroidery pattern identical to the specified embroidery pattern.

12. The non-transitory recording medium according to claim 11,
the instructions further cause, when executed by the controller, the computer to:
specify a position of the embroidery pattern in the taken image; and
arrange the outline indicated by the selected outline data item, based on the specified position.

13. The non-transitory recording medium according to claim 10,
the instructions further cause, when executed by the controller, the computer to:
specify a sewing position of the embroidery pattern on the sewing object;
specify a position of the outline of the embroidery pattern at the specified sewing position;
store the outline data item that indicates the specified outline, and outline position data that indicates the position of the specified outline, in association with each other; and
arrange the outline indicated by the selected outline data item, at the position indicated by the outline position data associated with the selected outline data item, when the stored outline data item is selected.

14. The non-transitory recording medium according to claim 10,
the instructions further cause, when executed by the controller, the computer to:
specify a sewing position of the embroidery pattern on the sewing object;
store the outline data item that indicates the specified outline, and sewing position data that indicates the position of the specified sewing position, in association with each other; and
arrange the outline indicated by the selected outline data item, at the position indicated by the sewing position data associated with the selected outline data item, when the stored outline data item is selected.

15. The non-transitory recording medium according to claim 10,
the instructions further cause, when executed by the controller, the computer to:
specify a sewing position of the embroidery pattern on the sewing object;
specify a position of the outline of the embroidery pattern at the specified sewing position;
specify a position of an indicator serving as a reference of arrangement of the outline, from the taken image;
store outline position data that indicates the specified position of the outline, and indicator position data that indicates the position of the indicator specified from a first image taken in a state where the sewing object is held at a first position, in association with each other; and
combine the position of the indicator in a second image taken in a state where the sewing object is held at a second position different from the first position, and the position of the indicator indicated by the stored indicator position data, to specify an arrangement position of the outline in the second image, and arrange the outline at the specified arrangement position.

* * * * *